US005639961A

United States Patent [19]
Lautenschütz

[11] Patent Number: 5,639,961
[45] Date of Patent: Jun. 17, 1997

[54] PROCESS FOR DIAGNOSING DEFECTS OF AN EXHAUST GAS RECIRCULATION DEVICE

[75] Inventor: Peter Lautenschütz, Plochingen, Germany

[73] Assignee: Mercedes-Benz AG, Germany

[21] Appl. No.: 670,697

[22] Filed: Jun. 26, 1996

[30] Foreign Application Priority Data

Jun. 26, 1995 [DE] Germany .......................... 19523106.6

[51] Int. Cl.$^{6}$ ............................ F02B 3/00; G01M 15/00; F02D 1/00; F02D 41/00

[52] U.S. Cl. ........................ 73/118.1; 73/117.3; 123/568; 123/571; 364/431.06; 364/431.061

[58] Field of Search .......................... 73/115, 116, 117.2, 73/117.3, 118.1, 118.2; 364/431.06; 123/568, 571

[56] References Cited

U.S. PATENT DOCUMENTS

| | | | |
|---|---|---|---|
| 3,789,816 | 2/1974 | Taplin et al. | 123/119 R |
| 4,104,990 | 8/1978 | Frobenius | 73/116 |
| 4,789,939 | 12/1988 | Hamburg | 364/431.05 |

FOREIGN PATENT DOCUMENTS

| | | |
|---|---|---|
| 0219202 | 4/1987 | European Pat. Off. . |
| 3828477 | 3/1989 | Germany . |
| 3934017 | 4/1990 | Germany . |
| 4135190 | 5/1992 | Germany . |
| 4212636 | 10/1992 | Germany . |
| 4224219 | 2/1993 | Germany . |
| 4326351 | 2/1994 | Germany . |

*Primary Examiner*—George M. Dombroske
*Attorney, Agent, or Firm*—Evenson, McKeown, Edwards & Lenahan P.L.L.C.

[57] ABSTRACT

The invention provides a process for diagnosing defects in an exhaust gas recirculation device of an internal-combustion engine system having an engine timing gear with a knock control. According to the invention, the firing point is advanced until a predetermined minimal knock control displacement is reached, at a time when the engine is operating in steady-state conditions and the exhaust gas recirculation device is active. Subsequently, the exhaust gas recirculation rate is reduced while the advanced firing point is maintained, and it is determined whether the knock control frequency or the knock control displacement change. If not, a defect in the exhaust gas recirculation device is concluded.

3 Claims, 1 Drawing Sheet

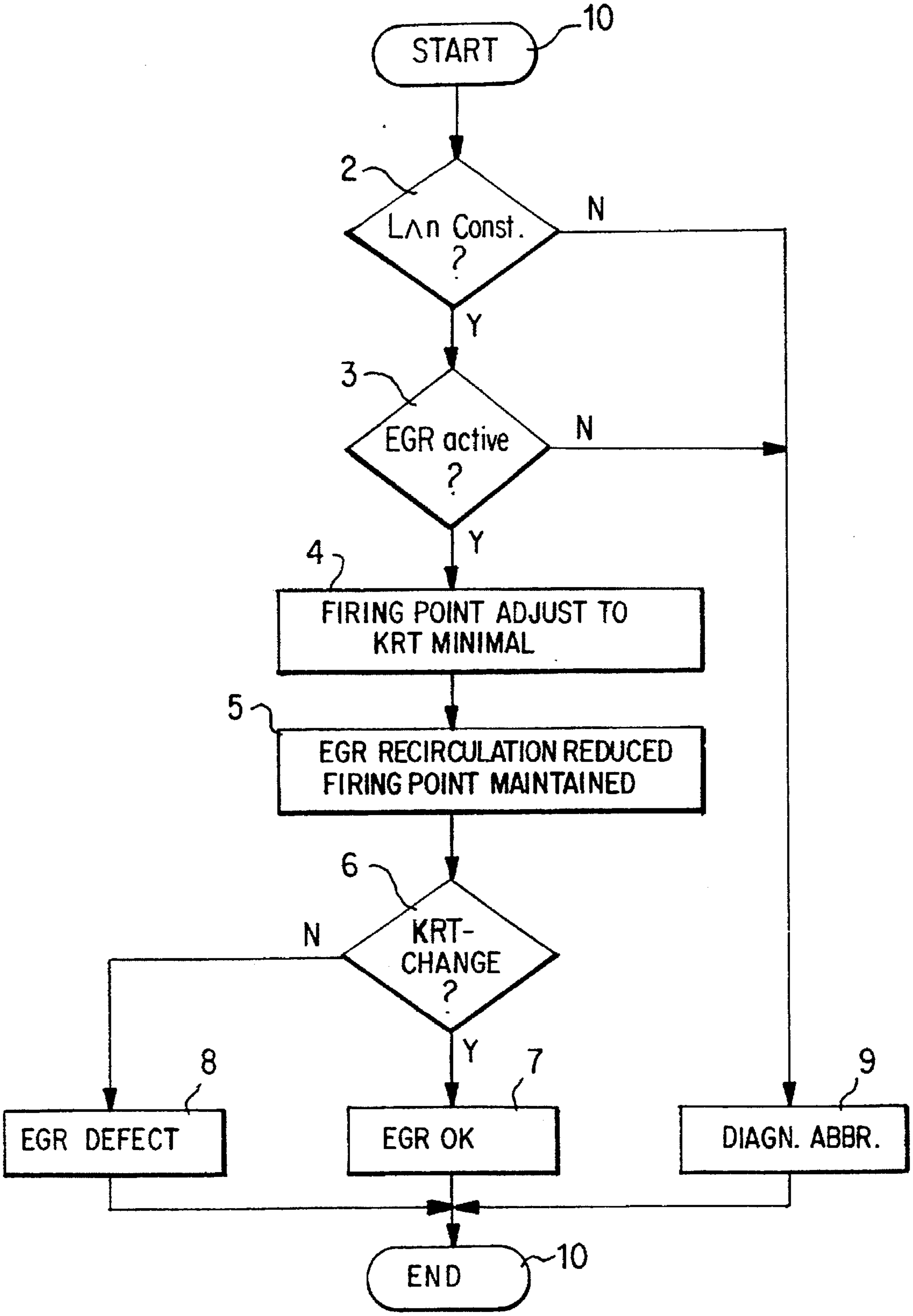
START
10
2
LΛn Const.
?
N
Y
3
EGR active
?
N
Y
4
FIRING POINT ADJUST TO
KRT MINIMAL
5
EGR RECIRCULATION REDUCED
FIRING POINT MAINTAINED
6
KRT-
CHANGE
?
N
Y
8
7
9
EGR DEFECT
EGR OK
DIAGN. ABBR.
END
10

PROCESS FOR DIAGNOSING DEFECTS OF AN EXHAUST GAS RECIRCULATION DEVICE

BACKGROUND AND SUMMARY OF THE INVENTION

This invention relates to a process for diagnosing defects in an exhaust gas recirculation device of an internal-combustion engine system having an engine timing gear with a knock control.

Known processes for diagnosing defects of exhaust gas recirculation devices in internal-combustion engine systems are based on the use of different sensors in the intake pipe area or in the area of an exhaust gas recirculation pipe, such as the pressure, temperature or pollutant sensing system. See, for example, German Patent Documents DE 38 28 477 A1, DE 41 35 190 A1, DE 42 12 636 A1, DE 42 24 219 A1 and DE 43 26 351 A1. In addition, in the process described in German Patent Document DE 42 12 636 A1, in order to keep the engine torque constant during the diagnosis, a firing point adjustment is carried out according to a detected change of the engine running condition, for diagnostic purposes, each time the exhaust gas recirculation valve is switched from an opened position into a closed position or vice versa.

Another process for diagnosing defects of an exhaust gas recirculation system is disclosed in European Patent Document EP 0 219 202 A2. In that arrangement the operability of the exhaust gas recirculation system is detected without ally special sensors, by taking advantage of the fact that during steady-state operating condition, the exhaust gas recirculation system is switched off. Thus, the fuel/air ratio is observed during steady state operation, specifically the integral proportion of the controlling device output signal of a corresponding fuel/air mixture control. When the change of this integral proportion is less than a given value, this is interpreted as a defect in the exhaust gas recirculation device.

On the other hand, internal-combustion engine systems are known which have an engine timing gear with a knock control. As an example, reference is made to German Patent Document DE 39 34 017 C2 and the literature cited there.

The object of the present invention is to provide a process for diagnosing defects of an exhaust gas recirculation device for an internal-combustion engine having an engine timing gear with a knock control, which process can detect defects in the exhaust gas recirculation system in a simple manner, without any special sensor system.

This object is achieved according to the invention, by utilizing the existing knock control of the engine timing gear, as well as the fact that in the case of an activated and properly functioning exhaust gas recirculation system, the knock limit shifts when the exhaust gas recirculation rate is reduced. In contrast, if the exhaust gas recirculation system is not intact, the knock limit does not change as a result of the adjustment of the exhaust gas recirculation device in the direction of a reduced exhaust gas recirculation rate.

A motor which is operating with exhaust gas recirculation has a different knock limit than one which operates without exhaust recirculation. Specifically the knock limit of the motor with recirculation is advanced by several degrees. (Typical examples are 20° and 24° before OT, respectively.) Thus, the process according to the invention is performed only when it is determined that the vehicle is at a steady state, with the exhaust gas recirculation system operating—that is, exhaust gas is being recirculated. When these conditions exist the recirculation system is activated to reduce the amount of exhaust gas which is recirculated and the knocking behavior of the engine is observed. If it is then necessary to retard the firing point in order to avoid knocking, it is concluded that the recirculation system is functioning normally. If, on the other hand, the actuation of the system to reduce the amount of exhaust gas recirculation does not cause a shift (or causes a minimal shift of, for example, 2° or less) in the knock limit—thus necessitating a retardation of the firing point—then it is concluded that the system is defective.

Other objects, advantages and novel features of the present invention will become apparent from the following detailed description of the invention when considered in conjunction with the accompanying drawings.

BRIEF DESCRIPTION OF THE DRAWINGS

The single FIGURE shows a program flow chart of a process according to the invention, for diagnosing of defects in an exhaust gas recirculation device of an internal-combustion engine system with an engine timing gear having a knock control.

DETAILED DESCRIPTION OF THE DRAWING

The process illustrated in the figure starts, after a starting step 1, with an inquiry (step 2) in which it is determined whether steady-state engine operating conditions exist; that is, whether the engine load (L) and the rotational engine speed (n) remain essentially constant. If not, the diagnosis cycle is stopped (step 9) and the process jumps to the cycle end 10.

If, however, steady-state operating conditions exist, it is inquired next (step 3) whether the exhaust gas recirculation device (AGR) is active. If not, once again the diagnosis flow is stopped (step 9) and the process jumps to the cycle end 10. If, however, the exhaust gas recirculation system is active, in step 4 the knock control contained in the engine timing gear is used to advance the firing point (ZZP) until a minimal so-called knock control displacement (KRT), also called knock control depth, is reached. The knock control displacement is the extent by which the firing angle is in each case retarded (that is, in the OT direction).

In a subsequent step 5, while the advanced firing point (ZZP) is maintained, the exhaust gas recirculation rate (EGRR) is reduced, and it is then observed (step 6) whether the knock control displacement, or as an equivalent thereto, the knock control frequency, changes, (particularly increases). If so, this is interpreted as an indication that the chain of effects of the exhaust gas recirculation system (EGR) is intact (step 7). If, on the other hand, despite a controlled reduction of the exhaust gas recirculation rate, no change occurs in the knock control frequency or the knock control displacement, then it is concluded that the exhaust gas recirculation system (EGR) is defective (step 8). In this case, remedial measures can be initiated in step 8. For example, a corresponding defect diagnosis may be activated or an audio or visual indication of a malfunction may be provided to the vehicle operator. Thereafter, as after a recognized intact exhaust gas recirculation system, the respective diagnosis cycle ends at step 10, and a new cycle can be started.

The process according to the invention permits diagnosis of defects of the exhaust gas recirculation device without any additional sensing system; for example, without any intake pipe pressure sensor which can therefore be eliminated if it is not otherwise required in the case of the internal-combustion engine system. Instead of utilizing such a sensor system, the defect diagnosis process according to the invention uses the function of knock control which is provided in the engine timing gear of the internal-combustion engine system. In this manner, the described firing point adjustment and the monitoring of the knock control displacement are achieved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for detecting defects of an exhaust gas recirculation device of an internal-combustion engine having an engine timing gear with a knock control, said process comprising the steps of:

determining a time when there are steady-state engine operating conditions and the exhaust gas recirculation device is active;

during said time, advancing a firing point of said engine until a predetermined minimal knock control displacement is reached;

reducing the exhaust gas recirculation rate, while maintaining the advanced firing point;

determining whether a knock control frequency or the knock control displacement changes in response to said reducing of the exhaust gas recirculation rate; and indicating a defect of the exhaust gas recirculation device if no change is determined.

2. Process according to claim 1 wherein said step of indicating a defect comprises activating an audio or visual alarm.

3. Process according to claim 1 further comprising the steps of:

activating a defect diagnosis when no change is determined in response to said reducing of exhaust gas recirculation rate.

* * * * *